(12) United States Patent
Lien

(10) Patent No.: US 7,757,704 B2
(45) Date of Patent: Jul. 20, 2010

(54) COUPLING ASSEMBLY WITH A CORE UNIT THEREIN

(75) Inventor: Chien Ping Lien, Taipei Hsien (TW)

(73) Assignee: Taiwan Vertex Production Corp., Taipei Hsien (TW)

( * ) Notice: Subject to any disclaimer, the term of this patent is extended or adjusted under 35 U.S.C. 154(b) by 404 days.

(21) Appl. No.: 12/003,410

(22) Filed: Dec. 26, 2007

(65) Prior Publication Data

US 2009/0167018 A1 Jul. 2, 2009

(51) Int. Cl.
*F16K 17/168* (2006.01)
*F16K 15/14* (2006.01)

(52) U.S. Cl. .............. 137/269.5; 137/493; 137/493.8; 137/854; 251/151; 308/308

(58) Field of Classification Search ............. 137/269.5, 137/271, 493, 493.8, 493.9, 614.2, 614.21, 137/854; 251/148, 151; 285/308, 319
See application file for complete search history.

(56) References Cited

U.S. PATENT DOCUMENTS

| | | | | |
|---|---|---|---|---|
| 793,577 A | * | 6/1905 | Frank ......................... 417/315 |
| 1,147,299 A | * | 7/1915 | Benson ........................ 400/261 |
| 1,185,333 A | * | 5/1916 | Keltner ...................... 137/269.5 |
| 3,179,122 A | * | 4/1965 | Wasdell ....................... 137/493 |
| 3,421,606 A | * | 1/1969 | Georges ....................... 188/320 |
| 3,785,401 A | * | 1/1974 | Button ....................... 137/493.2 |
| 5,277,171 A | * | 1/1994 | Lannes ...................... 122/14.31 |
| 2005/0057042 A1 * | | 3/2005 | Wicks ......................... 285/305 |

* cited by examiner

*Primary Examiner*—Stephen Hepperle
(74) *Attorney, Agent, or Firm*—Bacon & Thomas, PLLC

(57) ABSTRACT

A coupling assembly includes a female unit and a male unit which is removably connected with the female unit. A valve unit is located in the female unit and includes a core with two flexible disks on two ends thereof. A flange extends radially outward from a lower end of the core and is rested on a support frame in the female unit. The core extends through a through hole in a lower end of sleeve in the female unit. A plurality of paths are defined through the lower end of the sleeve so that by shifting the core to let either of two flexible disks to seal the paths in one direction, the direction of fluid flow can be controlled. The movement of the core is made by moving the sleeve.

4 Claims, 6 Drawing Sheets

COUPLING ASSEMBLY WITH A CORE UNIT THEREIN

FIELD OF THE INVENTION

The present invention relates to a coupling assembly with a valve unit in the female member so as to stop the fluid flow in either direction.

BACKGROUND OF THE INVENTION

A conventional coupling assembly known to applicant is disclosed in U.S. Pat. No. 5,104,158 which includes a male coupling member and a female coupling member and a clip member for connecting the male and female members. The clip member includes a tab portion so that the user can push the tab portion to release the male coupling member from the female coupling member. The disclosed coupling assembly allows the user to connect or release the male and female member quickly. Nevertheless, there is no valve unit located between the male and female members so that during working, fluid flows through the pipes and the male and female couplings and the user cannot stop the fluid to separate the male female coupling members when needed unless the source of the fluid is sealed or stopped.

The present invention intends to provide a coupling assembly for quickly connecting and releasing two pipes in which low pressure fluid passes, and a valve unit is located in the female member and can be operated to control the direction that the fluid flows.

SUMMARY OF THE INVENTION

The present invention relates to a coupling assembly which comprises a female unit and a male unit. The female unit includes a connection member which includes a connection end and a barbed tube extends from the connection end. A support frame is located in the connection end and a plurality of passages are defined around the support frame. The passages communicate with the barbed tube. A sleeve is engaged with the connection end and includes a through hole and a plurality of paths are defined through a lower end of the sleeve. A valve unit includes a core and two flexible disks which are connected on two ends of the core. A flange extends radially outward from a lower end of the core and is rested on the support frame. The core extends through the through hole of the sleeve such that the paths are located between the two disks. A female head is securely connected to the sleeve and includes an insertion hole with which an operation member is engaged. The male unit is removably inserted through the operation member and connected with the female head.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 is an exploded view to show the coupling assembly of the present invention;

DETAILED DESCRIPTION OF THE PREFERRED EMBODIMENT

Figure 1:
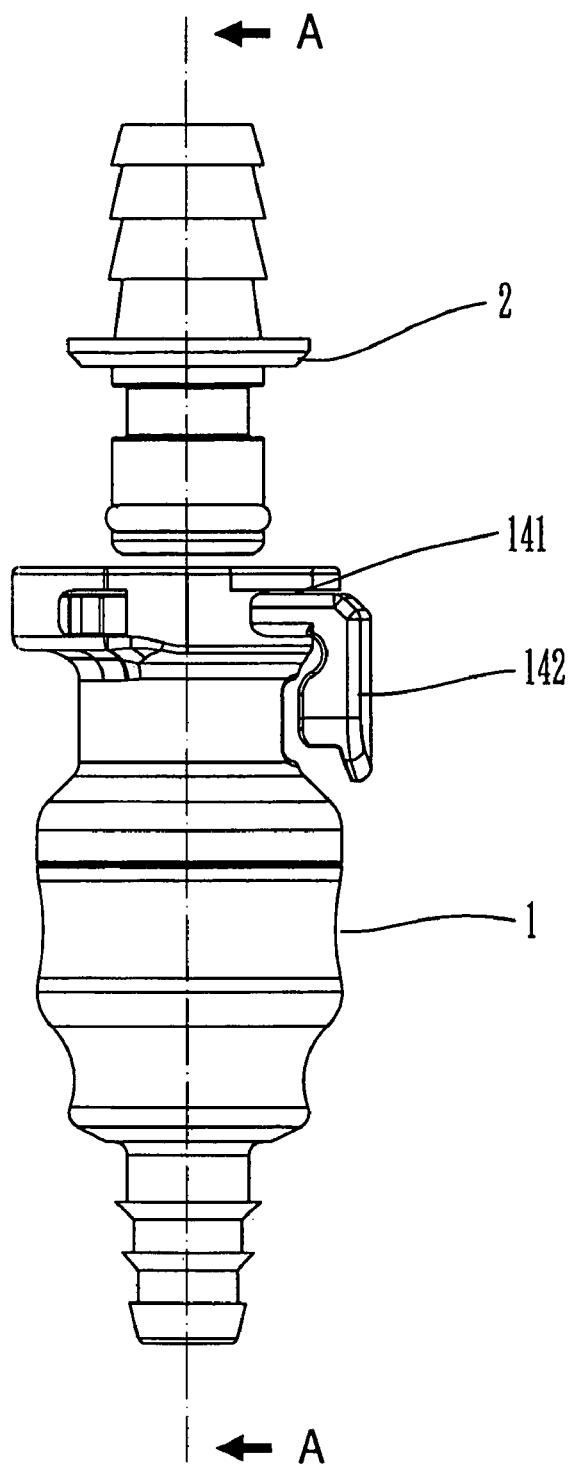
FIGS. 1-1 and 1-2 show two side views of the coupling assembly of the present invention.
Figure 2:
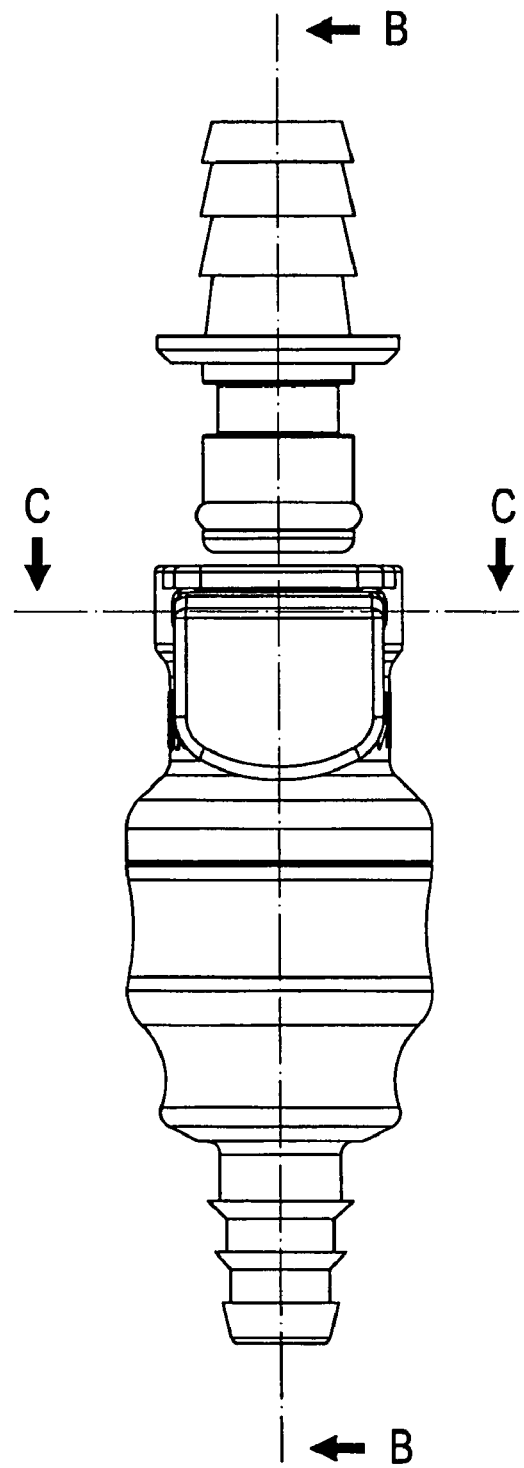
Figure 2:
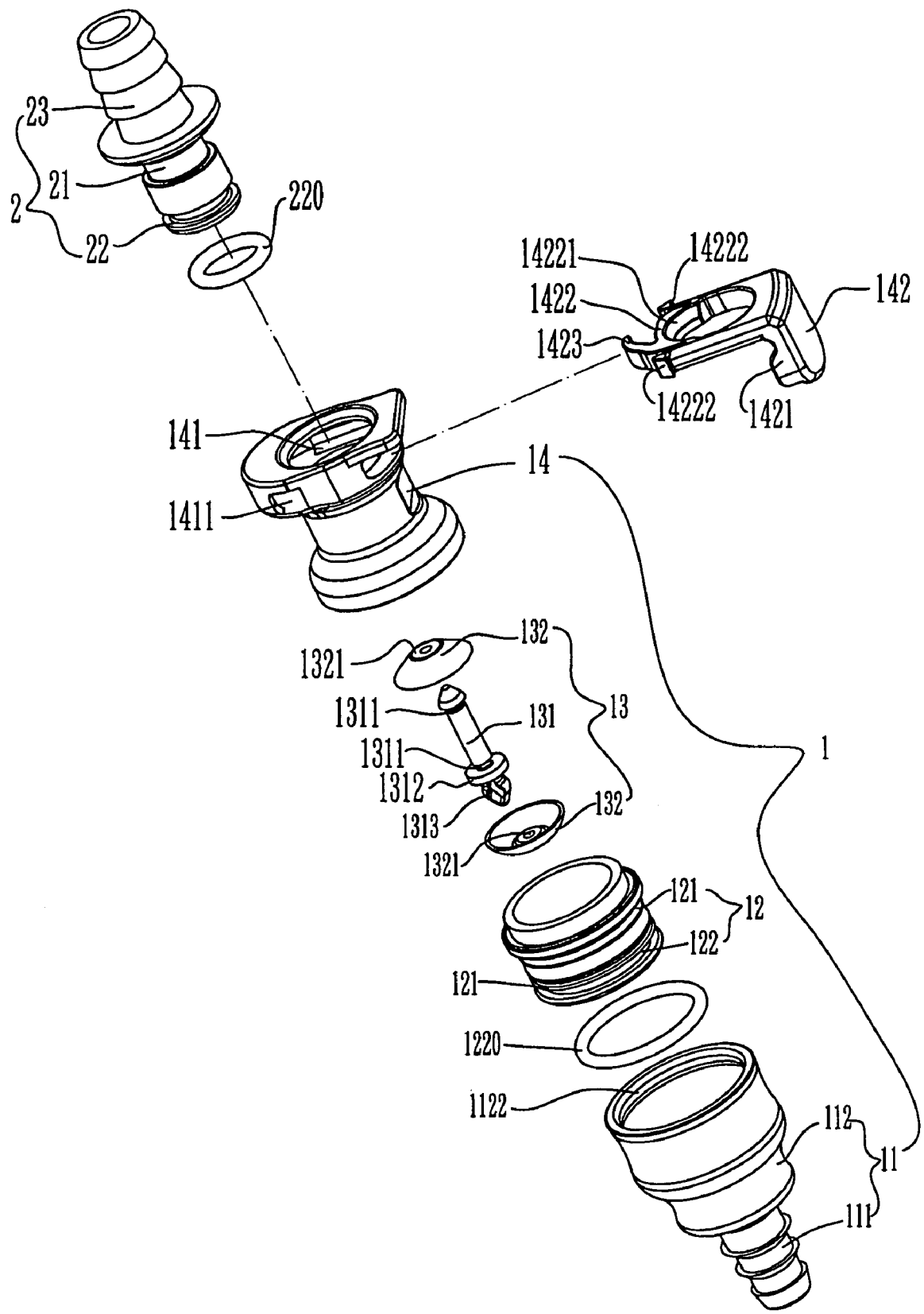
Figure 3:
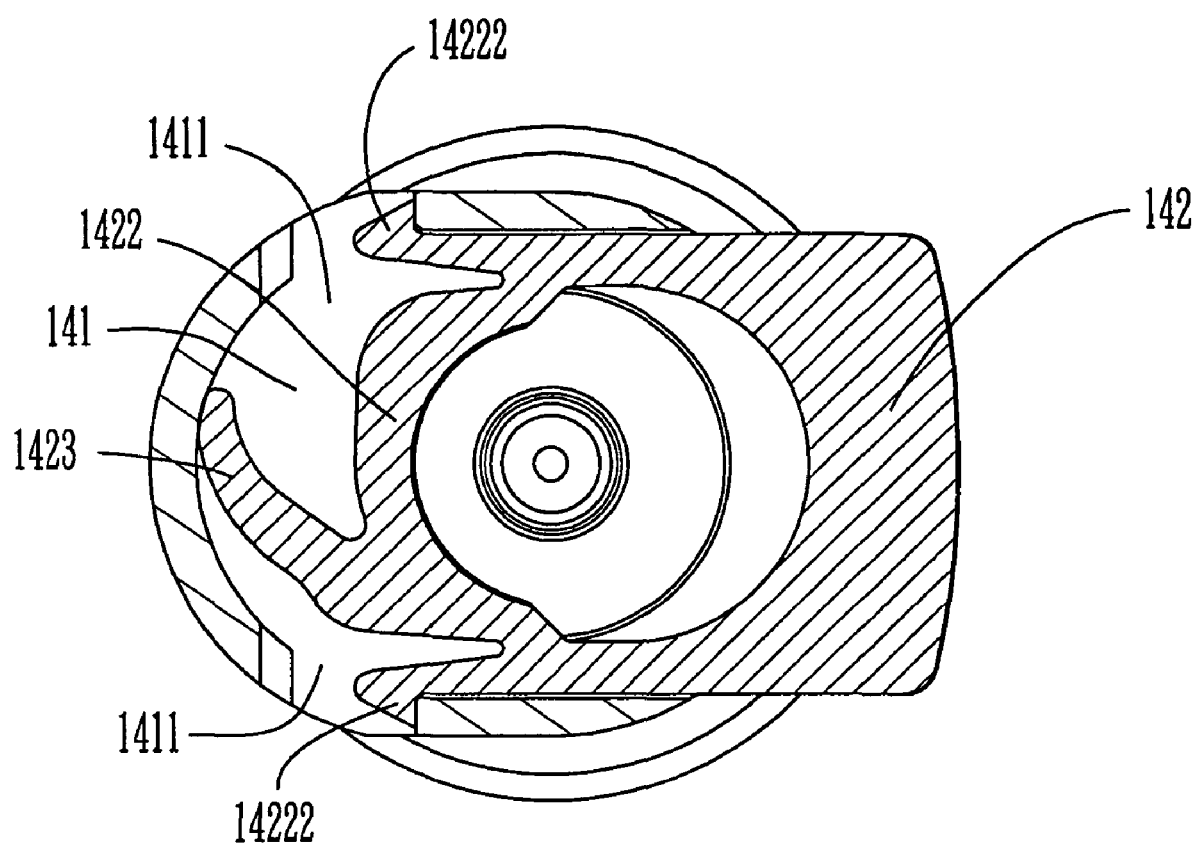
FIG. 3 is a cross sectional view taken along line C-C in FIG. 1-2 to show the operation member engaged with the female head.

Referring to FIGS. 1-1, 1-2, 2 and 3, the coupling assembly for lower pressure piping system of the present invention comprises a female unit 1 and a male unit 2. The female unit 1 includes a connection member 11 which includes an enlarged connection end 112 and a barbed tube 111 extends from the connection end 112 so as to be connected with a pipe or hose (not shown). A support frame 1121 is located in the connection end 112 and a plurality of passages 11212 are defined around the support frame 1121. The passages 11212 communicate with the barbed tube 111. The connection end 112 includes a rib 1122 extending inward from an inner periphery thereof.

A sleeve 12 is engaged with the connection end 112 and includes a through hole 123 and a plurality of paths 124 defined through a lower end of the sleeve 12. The sleeve 12 includes upper and lower engaging flanges 121 on an outer periphery thereof and a groove 122 is defined in the outer periphery of the sleeve 12 so that a seal 1220 is engaged with the groove 122.

A valve unit 13 is located in the sleeve 12 in the connection end 112 and includes a core 131 and two flexible disks 132 which are made by flexible material such as silicone. Two grooves 1311 are defined in an outer periphery of two ends of the core 131 and the two disks 132 each have an aperture 1321 through which one of the two ends of the core 131 extends and an inner periphery of each aperture 1321 is engaged with the groove 1311 corresponding thereto. A flange 1312 extends radially outward from a lower end of the core 131 and is rested on the support frame 1121 in the connection member 11. The core 131 includes an insertion 1313 on a lower end thereof and the support frame 1121 includes a central hole 11211 through which the insertion 1313 is engaged. The core 131 extends through the through hole 123 of the sleeve 12 such that the paths 124 are located between the two disks 132. A female head 14 is securely connected to the sleeve 12 and includes an insertion hole 141 with which an operation member 142 is engaged.

The female head 14 includes two engaging holes 1411 defined through a wall thereof and the engaging holes 1411 communicate with the insertion hole 141. The operation member 142 is an L-shaped member and includes a main part and a tab portion extending perpendicularly from an end of the main part. Two side plates 1421 extend from two sides of the tab portion. A hole is defined through the main part and includes a locking portion 1422 which defines a part of the hole in the main part. An inclined surface 14221 is defined in an inner periphery of the locking portion 1422. Two hooks 14222 extend from two sides of the main part and a flexible portion 1423 is located between the two hooks 14222 and extends from the locking portion 1422.

When the operation member 142 is engaged with the insertion hole 141, the two hooks 14222 engage with the two engaging hole 1411 in the female head 14 and the flexible portion 1423 is engaged with an inner periphery of the insertion hole 141.

The male unit 2 includes a barbed tube 23 connected to an end thereof so as to be connected with another pipe or hose (not shown), and a tubular portion is connected on the other end of the male unit 2. The tubular portion includes a groove 22 with a seal 220 engaged therewith and an engaging groove 21 is defined in an outer periphery of the tubular portion. The tubular portion is removably inserted through the operation member 142 and connected with the female head 14.

Figure 4:
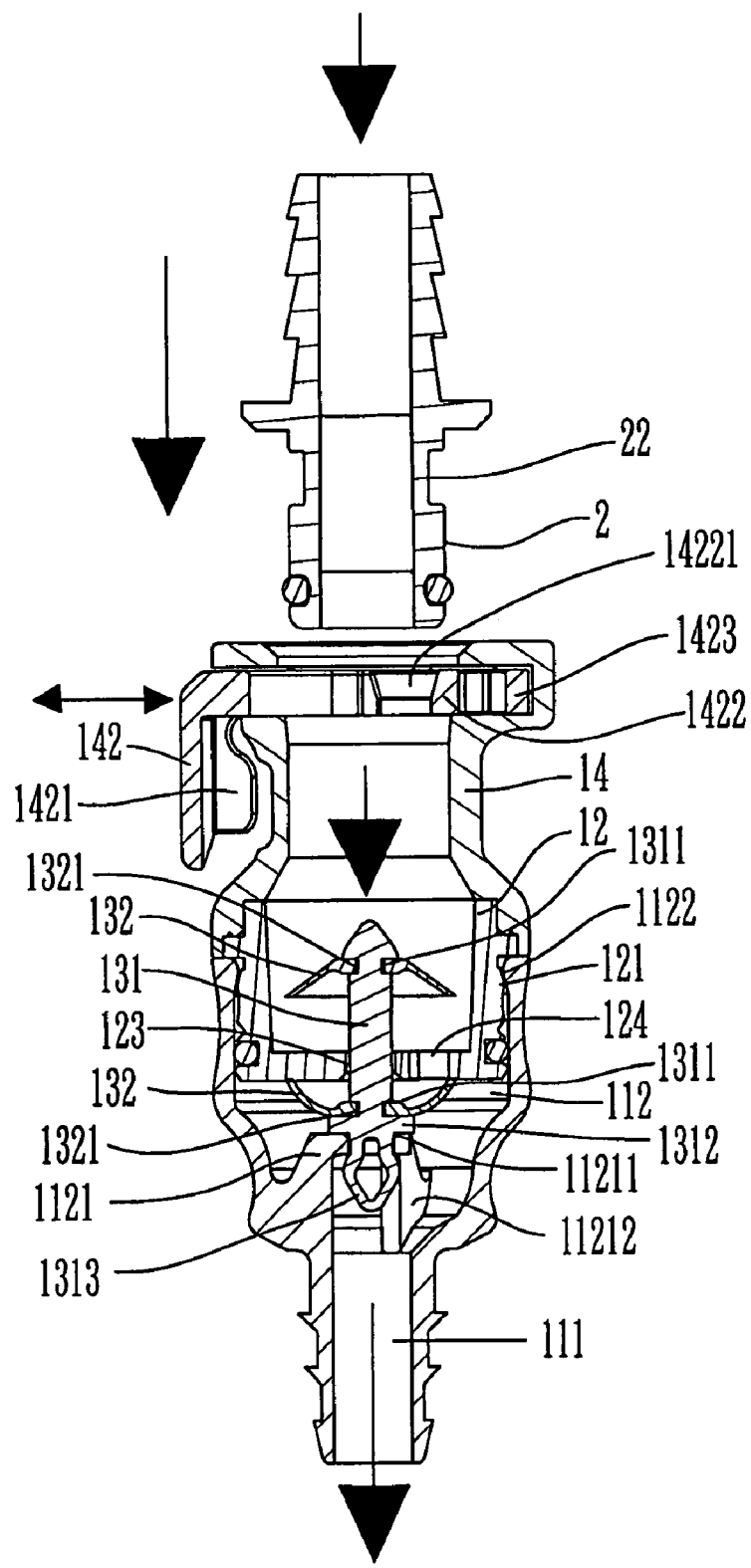
FIG. 4 is a cross sectional view taken along line A-A in FIG. 1-1 and shows that the sleeve is located at the first position to allow fluid to flow in one direction.
Figure 5:
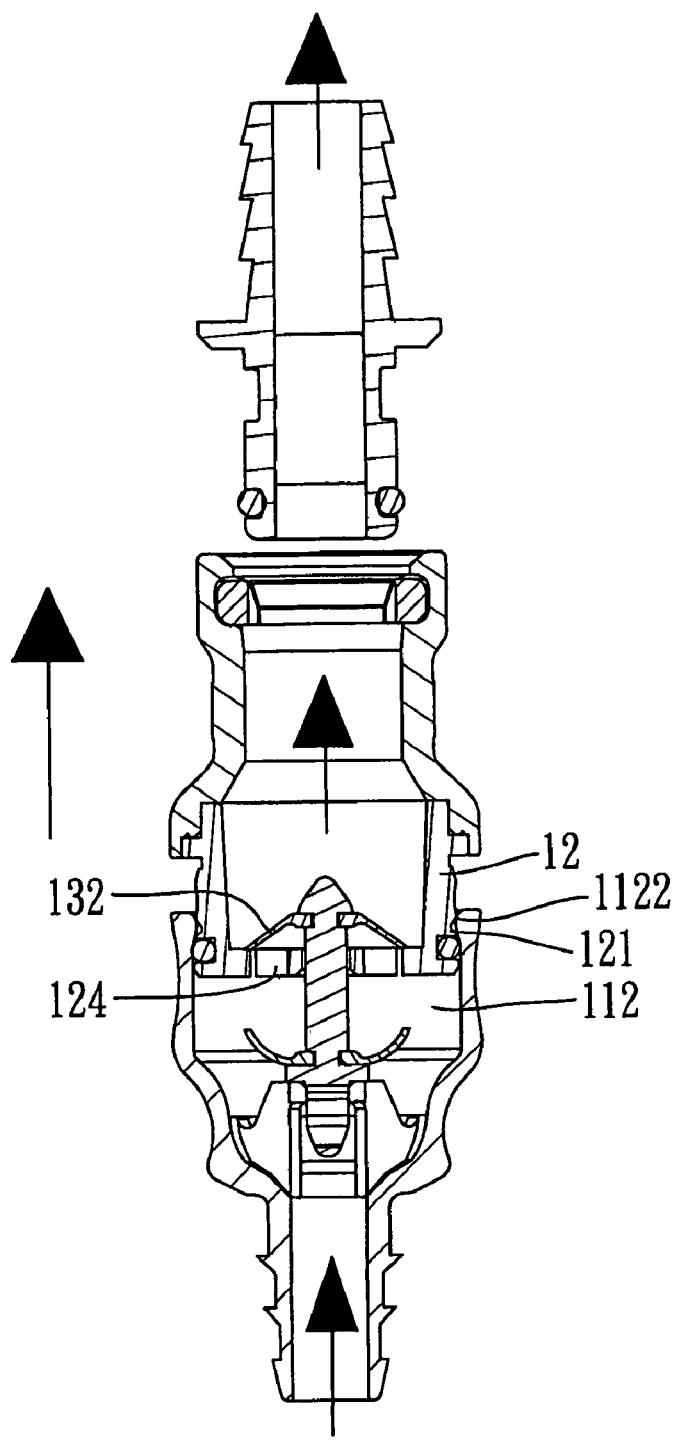
FIG. 5 is a cross sectional view taken along line B-B in FIG. 1-2 and shows that the sleeve is located at the second position to allow fluid to flow in the other direction.

As shown in FIG. 4, when the sleeve 12 is inserted into the connection end 112 and positioned in a first position, the upper engaging flange 121 is engaged beneath the rib 1122, the disk 132 seals the paths 124 from the lower end of the sleeve 12. The male unit 2 is inserted into the female head 14 via the operation member 142, the inclined surface 14221 guides the male unit 2 to easily insert into the female head 14 and the locking portion 1422 is pushed outward until the locking portion 1422 is bounced back by the flexible portion 1423 and engaged with the engaging groove 21 in the male unit 2. Fluid allows to flow from the female head 14, the sleeve 12 and the connection member 11. As shown in FIG. 5, when the sleeve 12 is inserted into the connection end 112 and positioned in a second position which is located higher than the first position, the lower engaging flange 121 is engaged beneath the rib 1122, the other disk 132 seals the paths 124 from a top of the lower end of the sleeve 12 so that fluid allows to flow from connection member 11, the sleeve 12 and the female head 14.

When pushing the tab portion of the operation member 142, the locking portion 1422 is moved and disengaged from the engaging groove 21, the male unit 2 can be separated from the female unit 1. The tab portion of the operation member 142 is stopped when touching the female head 14 to prevent the tab portion from overly bending.

Figure 6:
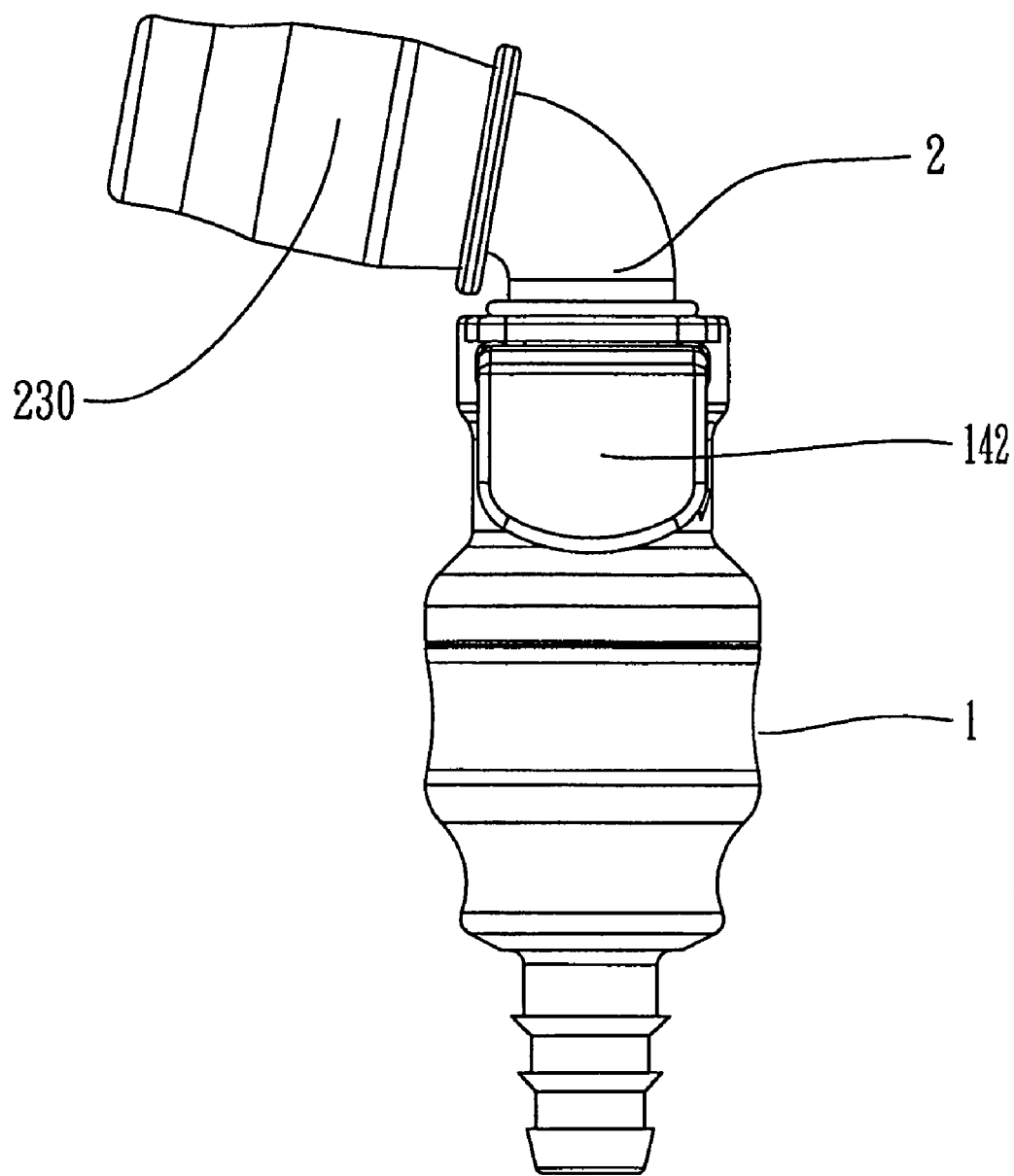
FIG. 6 shows a mouth piece is connected to the coupling assembly.

FIG. 6 shows that a mouth piece 230 can be connected to the male unit 2 to become a suction device for users such as cyclists or divers.

While we have shown and described the embodiment in accordance with the present invention, it should be clear to those skilled in the art that further embodiments may be made without departing from the scope of the present invention.

What is claimed is:

1. A coupling assembly comprising:
a female unit including a connection member which includes a connection end and a barbed tube extending from the connection end, a support frame located in the connection end and a plurality of passages defined around the support frame, the passages communicating with the barbed tube, a sleeve engaged with the connection end and including a through hole and a plurality of paths defined through a lower end of the sleeve;
a valve unit including a core and two flexible disks, two grooves defined in an outer peripheries of two ends of the core and the two disks each including an aperture through which one of the two ends of the core extends and an inner periphery of each aperture is engaged with the groove corresponding thereto, a flange extending radially outward from a lower end of the core and rested on the support frame, the core extending through the through hole of the sleeve such that the paths are located between the two disks, a female head securely connected to the sleeve and including an insertion hole with which an operation member is engaged, and
a male unit removably inserted through the operation member and connected with the female head.

2. The assembly as claimed in claim 1, wherein the connection end includes a rib extending inward from an inner periphery thereof and the sleeve includes upper and lower engaging flanges on an outer periphery thereof, when the sleeve is inserted into the connection end and positioned in a first position, the upper engaging flange is engaged beneath the rib, the disk seals the paths from the lower end of the sleeve so that fluid allows to flow from the female head, the sleeve and the connection member, when the sleeve is inserted into the connection end and positioned in a second position which is located higher than the first position, the lower engaging flange is engaged beneath the rib, the other disk seals the paths from a top of the lower end of the sleeve so that fluid allows to flow from connection member, the sleeve and the female head.

3. The assembly as claimed in claim 1, wherein the core includes an insertion on a lower end thereof and the support frame includes a central hole through which the insertion is engaged.

4. The assembly as claimed in claim 1, wherein the female head includes two engaging holes defined through a wall thereof and the engaging holes communicate with the insertion hole, the operation member is an L-shaped member and includes a main part and a tab portion extending perpendicularly from an end of the main part, two side plates extend from two sides of the tab portion, a hole defined through the main part and includes a locking portion which defines a part of the hole in the main part, an inclined surface is defined in an inner periphery of the locking portion, two hooks extend from two sides of the main part and a flexible portion is located between the two hooks and extends from the locking portion, when the operation member is engaged with the insertion hole, the two hooks engage with the two engaging hole in the female head and the flexible portion is engaged with an inner periphery of the insertion hole.

* * * * *